A. SIROIS.
Belt-Coupling.

No. 207,903. Patented Sept. 10, 1878.

WITNESSES:
Chas. Niela
C. Sedgwick

INVENTOR:
A. Sirois
BY Munn & Co
ATTORNEYS.

UNITED STATES PATENT OFFICE.

ARTHUR SIROIS, OF NEW YORK, N. Y.

IMPROVEMENT IN BELT-COUPLINGS.

Specification forming part of Letters Patent No. 207,903, dated September 10, 1878; application filed March 14, 1878.

*To all whom it may concern:*

Figure 1:
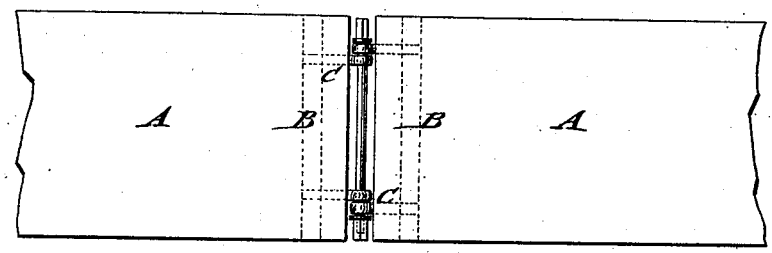
Figure 2:
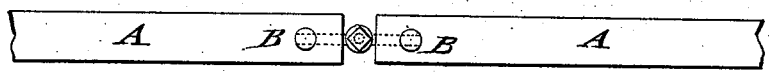
Figure 3:
Figure 4:
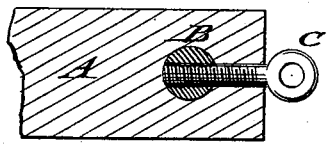

Be it known that I, ARTHUR SIROIS, of the city, county, and State of New York, have invented a new and Improved Belt-Coupling, of which the following is a specification:

In the accompanying drawing, Figure 1 represents a top view of a belt with my improved coupling; Fig. 2, a side view of the same. Fig. 3 is a side view of a leather cord with my coupling, and Fig. 4 a detail section of a belt or cord with my improved coupling attached thereto.

Similar letters of reference indicate corresponding parts.

The object of this invention is to furnish an improved coupling for the driving-belts of heavy machinery, and also for the driving-cords of lighter machinery, such as sewing-machines, &c., the coupling admitting of the instant connecting or disconnecting of the belts or cords while taking up a small space, so as not to interfere with the driving of the pulleys or wheels, thus furnishing a simple and durable coupling arrangement for belts of all kinds.

The invention consists of cross-pins driven through the ends of the belt, and of connecting hooks and eyes screwed into socket-holes of the pins, or of screw-eyes connected by a cross-pin or pintle.

Referring to the drawing, A represents a leather, rubber, or other belt or cord, as employed in heavy or light machinery for transmitting motion, and B are cross-pins, which are driven through the ends of the belts or cords a short distance back of the meeting edges of the same. These cross-pins B are provided with threaded socket-holes, into which the threaded shanks of eyes or hooks C are screwed by being first passed through the thickness of leather in front of the transverse pins, so as to screw them into the socket-holes of the pins. The coupling hooks or eyes C are in this manner retained in reliable and firm position in the ends of the belt or cord, and may readily be coupled together or uncoupled, according as the belt is to be applied to the driving belts or wheels, or to be taken off from the same.

If large belting is used, both ends are provided with eyes and connected by a cross-pin or pintle with detachable end nut, as shown in Figs. 1 and 2.

The coupling device takes up a smaller space than the thickness of the belt or the diameter of the cord, so as not to interfere with the running of the belt or cord on the pulley or wheel, while furnishing a perfectly reliable, durable, and convenient coupling for the driving belts or cords of all kinds of machinery.

Having thus described my invention, I claim as new and desire to secure by Letters Patent—

1. The combination of cross-pins, driven transversely through the driving-belt or cord near the meeting ends of the same, with coupling devices secured to socket-holes of the cross-pins, substantially as described.

2. The combination of cross-pins, driven transversely through the ends of driving belt or cord, with coupling-eyes screwed through the ends of the belt or cord into diametrical socket-holes of the pins, and being connected by a cross-pin or pintle, substantially as and for the purpose described.

ARTHUR SIROIS.

Witnesses:
C. SEDGWICK,
PAUL GOEPEL.